United States Patent
Zhou et al.

(10) Patent No.: US 9,986,556 B1
(45) Date of Patent: May 29, 2018

(54) ENHANCED TTI BUNDLING IN TDD MODE

(71) Applicant: Sprint Spectrum L.P., Overland Park, KS (US)

(72) Inventors: Yu Zhou, Herndon, VA (US); Muhammad Naim, Sterling, VA (US); Volkan Sevindik, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 507 days.

(21) Appl. No.: 14/265,099

(22) Filed: Apr. 29, 2014

(51) Int. Cl.
  H04B 7/00 (2006.01)
  H04W 72/04 (2009.01)
  H04B 7/26 (2006.01)

(52) U.S. Cl.
  CPC ...... H04W 72/0446 (2013.01); H04B 7/2656 (2013.01)

(58) Field of Classification Search
  CPC ............. H04W 72/04; H04W 72/0413; H04W 72/0446
  USPC .......................... 370/277, 280, 310, 329, 345
  See application file for complete search history.

(56) References Cited

U.S. PATENT DOCUMENTS

| | | | | |
|---|---|---|---|---|
| 8,553,591 B2 * | 10/2013 | Jiang | ..................... | H04W 72/04 370/280 |
| 8,817,734 B2 * | 8/2014 | Khoryaev | ......... | H04W 72/0413 370/252 |
| 2013/0242824 A1 | 9/2013 | Lee et al. | | |
| 2013/0242889 A1 | 9/2013 | Khoryaev et al. | | |
| 2013/0250924 A1 | 9/2013 | Chen et al. | | |
| 2013/0343273 A1 | 12/2013 | Barbieri et al. | | |
| 2014/0003374 A1 | 1/2014 | Kuo | | |
| 2014/0016582 A1 | 1/2014 | Prakash et al. | | |
| 2014/0040694 A1 | 2/2014 | Verma et al. | | |
| 2014/0098782 A1 | 4/2014 | Shirazi et al. | | |
| 2014/0153450 A1 * | 6/2014 | Jang | ..................... | H04B 7/2643 370/280 |
| 2014/0153453 A1 * | 6/2014 | Park | ..................... | H04B 7/2656 370/280 |
| 2015/0036561 A1 * | 2/2015 | Wang | ................ | H04W 72/0446 370/280 |
| 2015/0043434 A1 * | 2/2015 | Yamada | ............ | H04W 72/0446 370/329 |
| 2015/0092631 A1 * | 4/2015 | Meng | ........................ | H04L 1/00 370/280 |

(Continued)

FOREIGN PATENT DOCUMENTS

EP  2 635 082 A1  9/2013

Primary Examiner — Dmitry H Levitan

(57) ABSTRACT

A base station and a user equipment (UE) device may communicate over an air interface in a particular time division duplexing (TDD) configuration. The TDD configuration specifies a certain number of consecutive subframes for uplink communications and a certain number of consecutive subframes for downlink communications. A transmitter (either the UE device or the base station) may transmit data using transmission time interval (TTI) bundling with a bundle size of N. To select a set of N subframes to use to transmit the data, the transmitter may compare N to C, the number of consecutive subframes available to transmit the data. If N≤C, the N subframes in the set are consecutive subframes. If N>C, the set of N subframes includes C consecutive subframes and at least one additional subframe that is separated from the consecutive subframes by one or more subframes not in the set.

17 Claims, 8 Drawing Sheets

(56) References Cited

U.S. PATENT DOCUMENTS

| | | | |
|---|---|---|---|
| 2015/0109972 A1* | 4/2015 | Khoryaev | H04W 4/22 370/280 |
| 2015/0237644 A1* | 8/2015 | Golitschek Edler von Elbwart | H04W 72/12 370/329 |

* cited by examiner

ENHANCED TTI BUNDLING IN TDD MODE

BACKGROUND

In some wireless communication systems, when data that is transmitted by a transmitting entity to a receiving entity is not received by the receiving entity, or is received by the receiving entity with one or more errors, the data may be re-transmitted. The re-transmission of data could occur either automatically or in response to feedback from the receiving entity. For example, in Long Term Evolution (LTE) air interfaces, a Hybrid Automatic Repeat Request (HARQ) procedure is used. In the HARQ approach, after a transmitting entity has transmitted a block of data, the transmitting entity waits to receive a HARQ response from the receiving entity. If the transmitting entity receives a positive acknowledgement (ACK) as the HARQ response, then no re-transmission is needed and the transmitting entity can transmit additional data. If the transmitting entity receives a negative acknowledgement (NACK) as the HARQ response, then the transmitting entity re-transmits the data. The transmitting entity may also re-transmit the data if the transmitting entity does not receive any HARQ response within a certain period of time.

This re-transmission approach can allow data to be successfully transmitted from a transmitting entity to a receiving entity even when there is a substantial probability that the transmitted data will be received with one or more errors, for example, because of poor radio frequency (RF) conditions. Specifically, the data can be re-transmitted multiple times until the data is received without errors. This re-transmission approach, however, also increases latency. For example, there can be a period of delay between when the transmitting entity transmits data and when the transmitting entity receives a NACK response from the receiving entity and another period of delay between when the transmitting entity receives the NACK response and when the transmitting entity begins re-transmitting the data.

In order to reduce the delay associated with re-transmitting data, LTE supports a bundling option for data transmissions by a user equipment (UE) device in the Physical Uplink Shared Channel (PUSCH). Normally, a UE device transmits data in one transmission time interval (TTI), which corresponds to a 1 millisecond (ms) subframe, and then waits to receive a HARQ response before re-transmitting the data or transmitting additional data. However, when TTI bundling is used, the UE device transmits the same data four times in four consecutive TTIs and then waits to receive a HARQ response. In this way, the UE device can transmit four instances of the same data, which allows for more robust reception of the data, but without the delay that would be associated with the UE device transmitting the data four times and waiting for a HARQ response after each transmission.

OVERVIEW

An LTE system may use time division duplexing (TDD) for wireless communications between base stations and UE devices. In the TDD approach, certain subframes are reserved for uplink communications and certain subframes are reserved for downlink communications. However, a TDD configuration may be unable to support conventional TTI bundling in which four consecutive TTIs are used to transmit the same data four times. For example, some TDD configurations may have fewer than four consecutive subframes reserved for uplink communications.

Described herein are methods and systems that can provide enhanced TTI bundling for TDD configurations. In one aspect of such approaches, the number of transmissions of the same data (bundle size) can be made variable. In another aspect, the transmissions need not occur in consecutive subframes.

Example embodiments provide a method for wireless communication in a wireless network using a TDD configuration. The TDD configuration specifies alternating time periods for uplink communications and downlink communications, in which a time period for uplink communications has U consecutive subframes and a time period for downlink communications has D consecutive subframes, wherein U≥1 and D≥1. The method involves: (a) identifying, by a transmitter, data to be transmitted to a receiver using TTI bundling; (b) obtaining, by the transmitter, a bundle size, N, to use for the TTI bundling, wherein N>1; (c) determining, by the transmitter, a number of consecutive subframes, C, available to transmit the data to the receiver; (d) performing, by the transmitter, a comparison of N to C; (e) selecting, by the transmitter, based on the comparison of N to C, a set of N subframes for N transmissions of the data to the receiver; and (f) transmitting, by the transmitter, the data N times to the receiver, using the set of N subframes.

Example embodiments also provide an apparatus. The apparatus comprises a transceiver for transmitting and receiving wireless communications according to a TDD configuration. The TDD configuration specifies alternating time periods for uplink communications and downlink communications, in which a time period for uplink communications has U consecutive subframes and a period for downlink communications has D consecutive subframes, wherein U≥1 and D≥1. The apparatus further comprises: a processor; data storage; and program instructions stored in the data storage and executable by the processor to cause the apparatus to perform functions. The functions comprise: (a) identifying data to be transmitted to a receiver using TTI bundling; (b) obtaining a bundle size, N, to use for the TTI bundling, wherein N>1; (c) determining a number of consecutive subframes, C, available to transmit the data to the receiver; (d) performing a comparison of N to C; (e) selecting, based on the comparison of N to C, a set of N subframes for N transmissions of data to the receiver; and (f) transmitting, via the transceiver, the data N times to the receiver using the set of N subframes.

DETAILED DESCRIPTION OF EXAMPLE EMBODIMENTS

1. Introduction

Figure 1:
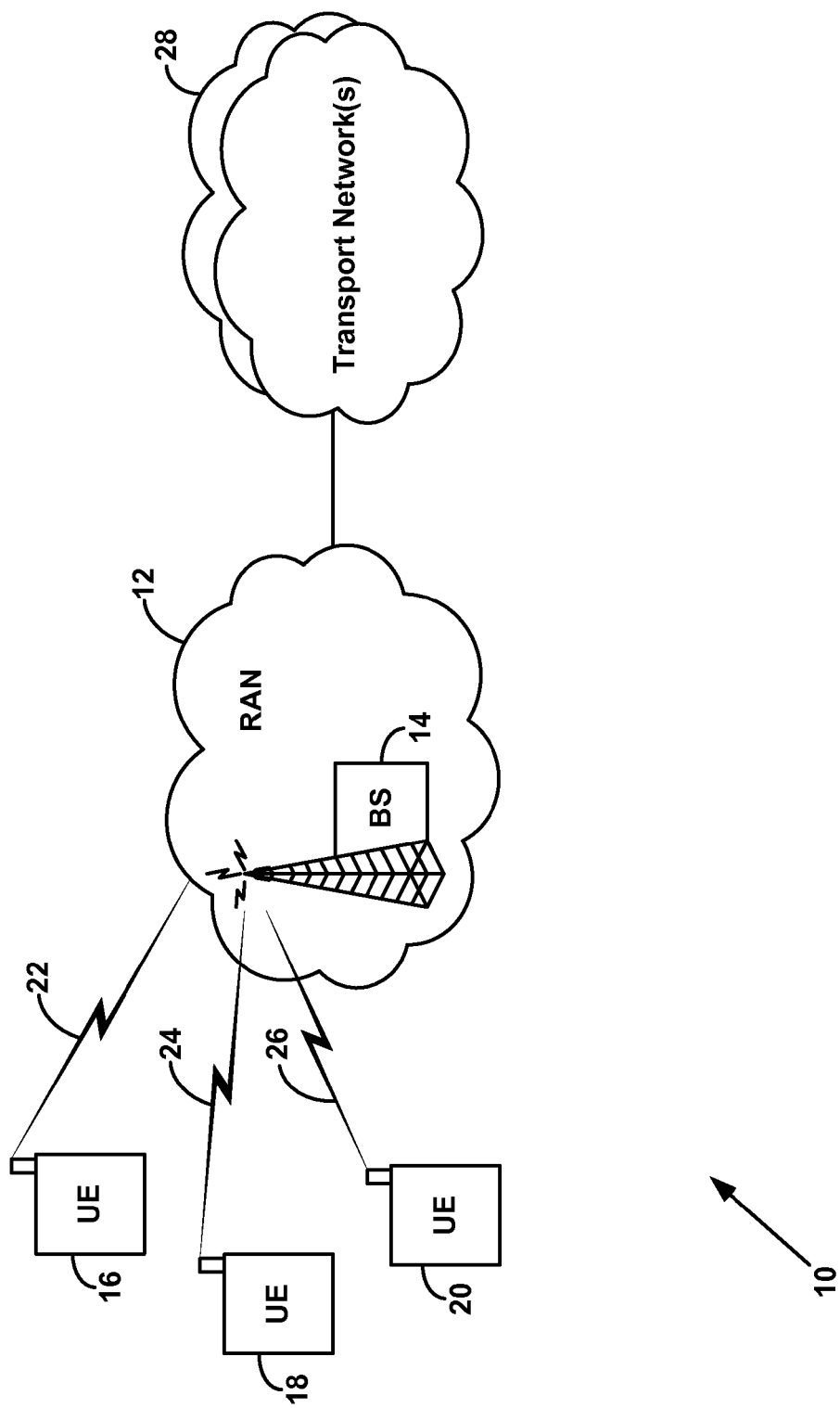
FIG. 1 is a block diagram of a communication system, in accordance with an example embodiment.

Disclosed herein are methods and systems that can provide enhanced TTI bundling for TDD configurations. The enhanced TTI bundling could be used by a UE device transmitting data in an uplink shared channel (e.g., a PUSCH channel). The enhanced TTI bundling could also be used for a base station transmitting data in a downlink shared channel (e.g., a PDSCH channel).

In one aspect of the enhanced TTI bundling, the bundle size can be variable. For example, a base station may determine a TTI bundle size for a particular UE device and then indicate to the UE device what bundle size to use for the TTI bundling. The base station could determine the TTI bundle size based on one or more uplink parameters, such as a signal-plus-interference-to-noise ratio (SINR) of the UE's signal at the base station, a delay budget for the UE's data or other quality of service (QoS) considerations, and/or utilization of the uplink shared channel. The bundle size that is determined in this way could be four (as with convention TTI bundling), or less than four (e.g., if the SINR is relatively high or to conserve resources if the utilization is high). In addition, some implementations could support a bundle size that is greater than four.

Similarly, a base station may determine a TTI bundle size to use when transmitting data to a UE device using TTI bundling. The base station may determine the TTI bundle size based on one or more downlink parameters, such as a SINR of the base station's signal at the UE device (which the UE device may report to the base station), a delay budget for the base station's data or other QoS considerations, and utilization of the downlink shared channel.

In another aspect of the enhanced TTI bundling, the multiple transmissions of the same data need not occur in consecutive subframes. This aspect can be particularly useful for TDD configurations that have fewer than four consecutive uplink subframes, in the case of TTI bundling by a UE device, or TDD configurations that have fewer than four consecutive downlink subframes, in the case of TTI bundling by a base station. In this regard, LTE defines seven different TDD configurations, identified as "TDD configuration 0" through "TDD configuration 6," each having a different respective sequence of uplink subframes, downlink subframes, and special subframes. See Table 4.2-2 in $3^{rd}$ Generation Partnership Project, TS 36.211, V12.0.0 (2013-12), hereinafter "3GPP specification." These TDD configurations are summarized below in Table 1.

TABLE 1

| TDD Config. No. | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In Table 1, a "U" indicates an uplink subframe, i.e., a subframe that is reserved for uplink communications, a "D" indicates a downlink subframe, i.e., a subframe that is reserved for downlink communications, and an "S" indicates a special subframes. A special subframe allows time for switching from downlink communications to uplink communications. A special subframe consists of three fields: a Downlink Pilot Time Slot (DwPTS), a Guard Period (GP) and an Uplink Pilot Time Slot (UpPTS). The DwPTS is a shortened downlink subframe with 3/9/10/11/12 OFDM symbols, which could be used for downlink communications.

Notably, none of the TDD configurations in the above-referenced 3GPP specification has more than three consecutive uplink subframes. As a result, conventional TTI bundling, in which the same data is transmitted in four consecutive subframes, is not available for uplink communications. However, the two aforementioned aspects of the enhanced TTI bundling approaches described can allow for TTI bundling to be used with such TDD configurations.

First, since the bundle size is variable, it is possible for a bundle size less than four to be selected. The smaller bundle size might allow the transmissions to occur in consecutive subframes. For example, if the bundle size is three, a UE device could use TTI bundling with TDD configuration 0 by transmitting the same data in three consecutive uplink subframes (e.g., subframes 2, 3, and 4).

Second, in the case that the bundle size is larger than the number of consecutive subframes available in the TDD configuration, the enhanced TTI bundling approaches described herein allow for non-consecutive subframes to be used. For example, if the bundle size is four, a UE device could use TTI bundling with TDD configuration 0 by transmitting the same data in three consecutive uplink subframes (e.g., subframes 2, 3, and 4) and one additional uplink subframe (e.g., subframe 7).

To facilitate this second aspect of enhanced TTI bundling, the transmitter of the data using TTI bundling (e.g., a UE device transmitting data in an uplink shared channel or a base station transmitting data in a downlink shared channel) may determine whether to use consecutive subframes or non-consecutive subframes. For example, the transmitter may compare the bundle size, N, with the number of consecutive subframes, C, available to transmit the data. N could be determined based on various parameters, as described herein. C is based on the particular TDD configuration being used. If N≤C, then the transmitter may use N consecutive subframes. If N>C, then the transmitter may use C consecutive subframes and one or more additional subframes (e.g., N−C subframes).

2. Example Communication System

FIG. 1 is a block diagram of a communication system 10 in which exemplary embodiments may be employed. Communication system 10 includes a radio access network (RAN) 12 that includes one or more entities that can communicate over an air interface, as exemplified by base station (BS) 14. RAN 12 could also include one or more control entities, such as a base station controller (BSC) or radio network controller (RNC). BS 14 could be, for example, a base transceiver station, a wireless access point, an access node, a Node-B, or an eNodeB. Although FIG. 1 shows only one base station in RAN 12, it is to be understood that RAN 12 could include any number of base stations.

BS 14 radiates to define one or more wireless coverage areas within which BS 14 can wirelessly communicate with UE devices. The wireless coverage area defined by BS 14 could be a cell that generally surrounds BS 14. Alternatively, BS 14 may define multiple wireless coverage areas, such as sectors. Each sector may be defined by multiple antennas in BS 14 so as to generally correspond to a range of azimuthal angles (e.g., 120°) about BS 14.

For purposes of illustration, BS 14 is shown as being in wireless communication with UEs 16, 18, and 20 via respective air interfaces 22, 24, and 26. UEs 16, 18, and 20 could be wireless telephones, wireless handheld, tablet, or laptop computers, or other types of wireless communication devices. Although FIG. 1 shows BS 14 in wireless communication with three UEs, it is to be understood that BS 14 could be in wireless communication with a greater or fewer number of UEs. In addition, the number of UEs in wireless communication with BS 14 can change over time, for example, as a result of one or more UEs moving into or out of the wireless coverage area of BS 14 and/or as a result of one or more UEs beginning or ending communication sessions.

Air interfaces 22, 24, and 26 could use a TDD configuration that specifies alternating time periods for uplink communications and downlink communications, in which a time period for uplink communications has U consecutive subframes and a time period for downlink communications has D consecutive subframes, and wherein U≥1 and D≥1. The TDD configuration used by air interfaces 22, 24, and 26 could be, for example, one of the TDD configurations shown above in Table 1. For purposes of illustration, the communications over air interfaces 22, 24, and 26 will be described herein with respect to the LTE protocol. It is to be understood, however, that other wireless communication protocols could be used.

RAN 12 may provide access to one or more transport networks 28, which could include, for example, the public switched telephone network (PSTN) and/or the Internet or other packet-switched networks. With this arrangement, a UE device being served by BS 14 may engage in a communication session, via RAN 12, with an endpoint connected to one of transport networks 28. The endpoint could be, for example, another UE device, a landline telephone, an email server, Web server, media server, or gaming server. The communication session could involve voice, text, images, video, data, or other media that is transferred from the UE device to the endpoint and/or from the endpoint to the UE device.

Thus, when a UE device, such as UE 16, 18, or 20, is involved in a communication session, the UE may transmit data over an uplink channel to BS 14 and may receive data from BS 14 over a downlink channel. In some cases, the communication session could be one that involves a user of the UE device, such as a voice communication application or Web browsing application. In other cases, the communication session could involve a background task, such as periodically registering with wireless network 12. In some implementations, UEs 16, 18, and 20 may transmit data to BS 14 over an uplink shared channel. The usage of the uplink shared channel may be controlled by BS 14 or by some other entity in wireless network 12.

Figure 2A:
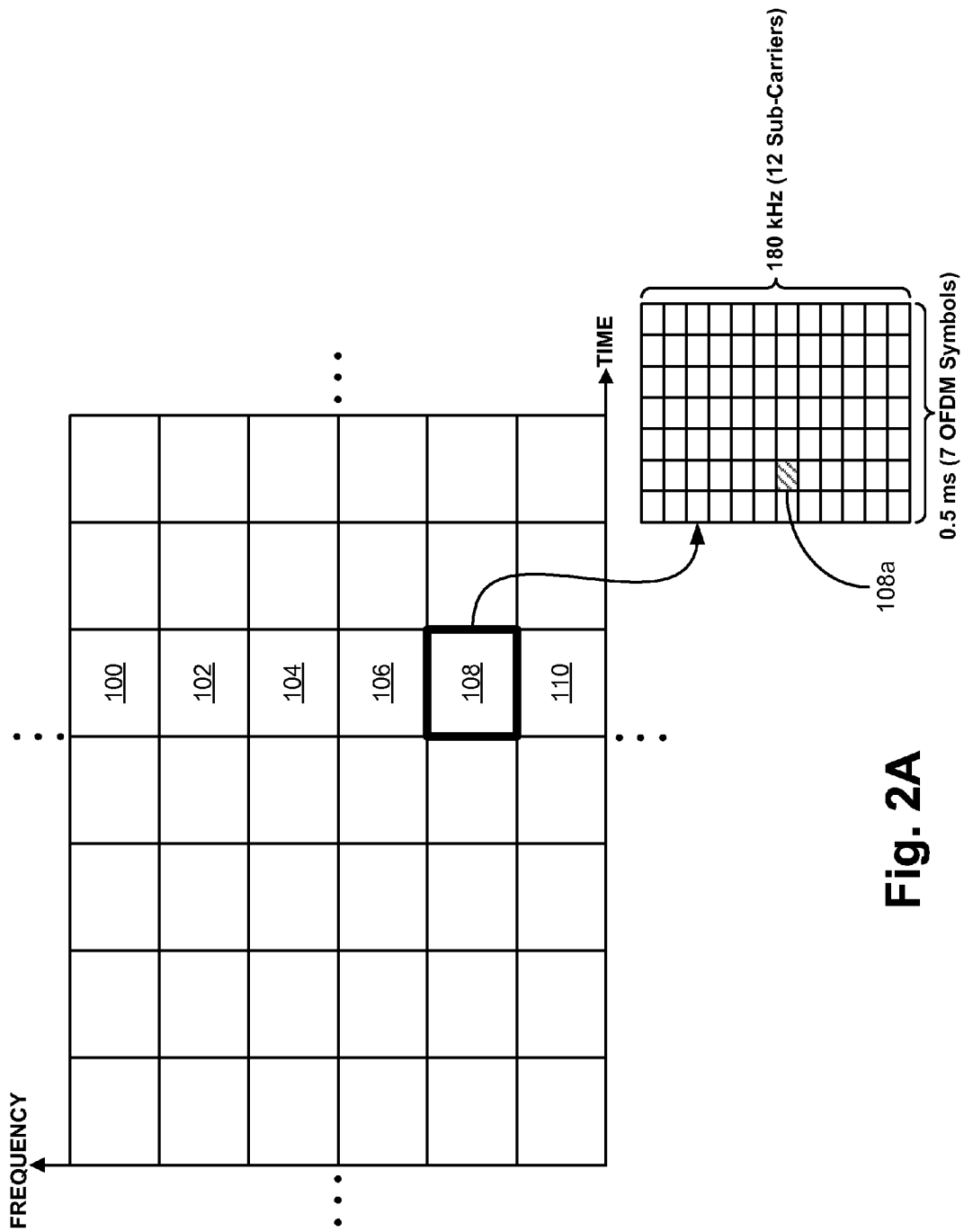
FIG. 2A is a conceptual illustration of a division of uplink resources into resource blocks, in accordance with an example embodiment.

For example, the LTE protocol defines a Physical Uplink Shared Channel (PUSCH) that UEs can use to transmit data to a base station and a Physical Downlink Shard Channel (PDSCH) that the base station can used to transmit data to the UEs. Portions of the PUSCH and the PDSCH may be allocated to particular UEs by allocating resource blocks. FIG. 2A illustrates how the uplink resources and the downlink resources in a given wireless coverage area may be divided in time and frequency domains into resource blocks. In an LTE air interface, data is transmitted on both the uplink and the downlink in the form of orthogonal frequency division multiplexing (OFDM) symbols. Each OFDM symbol is formed from a plurality of sub-carriers, typically 12 sub-carriers, each with a bandwidth of 15 kHz. Thus, a resource block corresponds to a plurality of sub-carriers that are used to form an OFDM symbol and has a duration that can accommodate a particular number of OFDM symbols.

In the time domain, each resource block typically occupies a 0.5 ms slot of time. By way of example, FIG. 2A shows resource blocks 100-110 for a particular slot. In the frequency domain, each of resource blocks 100-110 occupies a respective portion of frequency bandwidth, typically 180 kHz in LTE implementations. Although FIG. 2A shows six resource blocks in each slot, a wireless coverage area could have a greater number of resource blocks, as indicated by the dots above and below resource blocks 100-110.

FIG. 2A also includes a more detailed view of resource block 108. This detailed view shows that the 180 kHz of frequency bandwidth corresponds to 12 sub-carriers of 15 kHz each. Further, in this example, the 0.5 ms slot of time corresponds to the duration of seven OFDM symbols. In other examples, a 0.5 ms slot could correspond to a different number of OFDM symbols. Thus, a resource block may be described as a set of resource elements, with each resource element corresponding to one modulated sub-carrier in an OFDM symbol. The detailed view of uplink resource block 108 in FIG. 2A shows the division of the resource block into multiple resource elements, such as resource element 108a.

One or more uplink resource blocks may be allocated to a particular UE device to transmit data in the uplink shared channel (PUSCH). For example, resource blocks 100 and 102 might be allocated to UE 16, resource blocks 104-108 might be allocated to UE 18, and resource block 110 might be allocated to UE 20. The allocation of resource blocks to UEs could be made by BS 14 or by some other entity in wireless network 12. Similarly, one or more downlink resource blocks could be allocated to a particular UE device to receive data that is transmitted by the base station in the downlink shared channel (PDSCH).

Figure 2B:
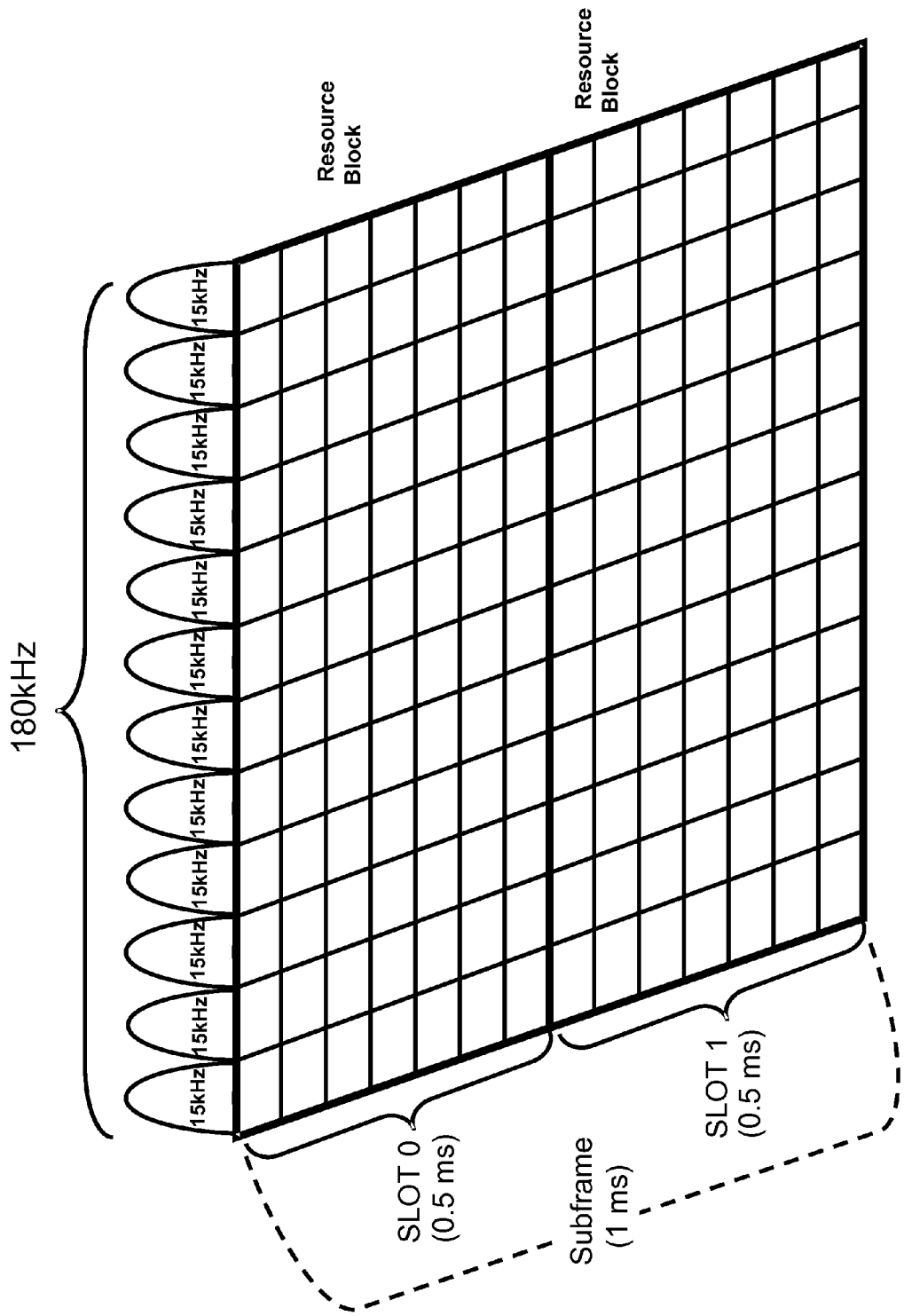
FIG. 2B is a conceptual illustration of two time-consecutive resource blocks, in accordance with an example embodiment.

FIG. 2B illustrates an uplink resource allocation for a UE that is maintained for two consecutive slots of time (Slot 0 and Slot 1) in a given subframe (a downlink resource allocation may be similar). The two consecutive slots of time are treated as a transmission time interval (TTI) for purposes of LTE's HARQ process. In particular, after a UE has transmitted its data in a TTI, such as shown in FIG. 2B, the UE waits to receive a HARQ response from the RAN to determine whether the data should be re-transmitted or whether the UE can transmit additional data. If the HARQ response is an ACK, indicating that the data was successfully received, then the UE can transmit additional data. If the HARQ response is a NACK, indicating that the data was received with one or more errors, then the UE re-transmits the data. The UE may also re-transmit the data if the UE does not receive a HARQ response within a predetermined period of time.

On the other hand, if a UE has been instructed to use TTI bundling, then the UE may transmit the same data in multiple TTIs before waiting for a HARQ response. The TTI bundle size is the number of TTIs that the UE uses to transmit the data. Thus, a TTI bundle size of N means that the UE transmits the same data N times before waiting for a HARQ response.

3. Example Methods

Figure 3:
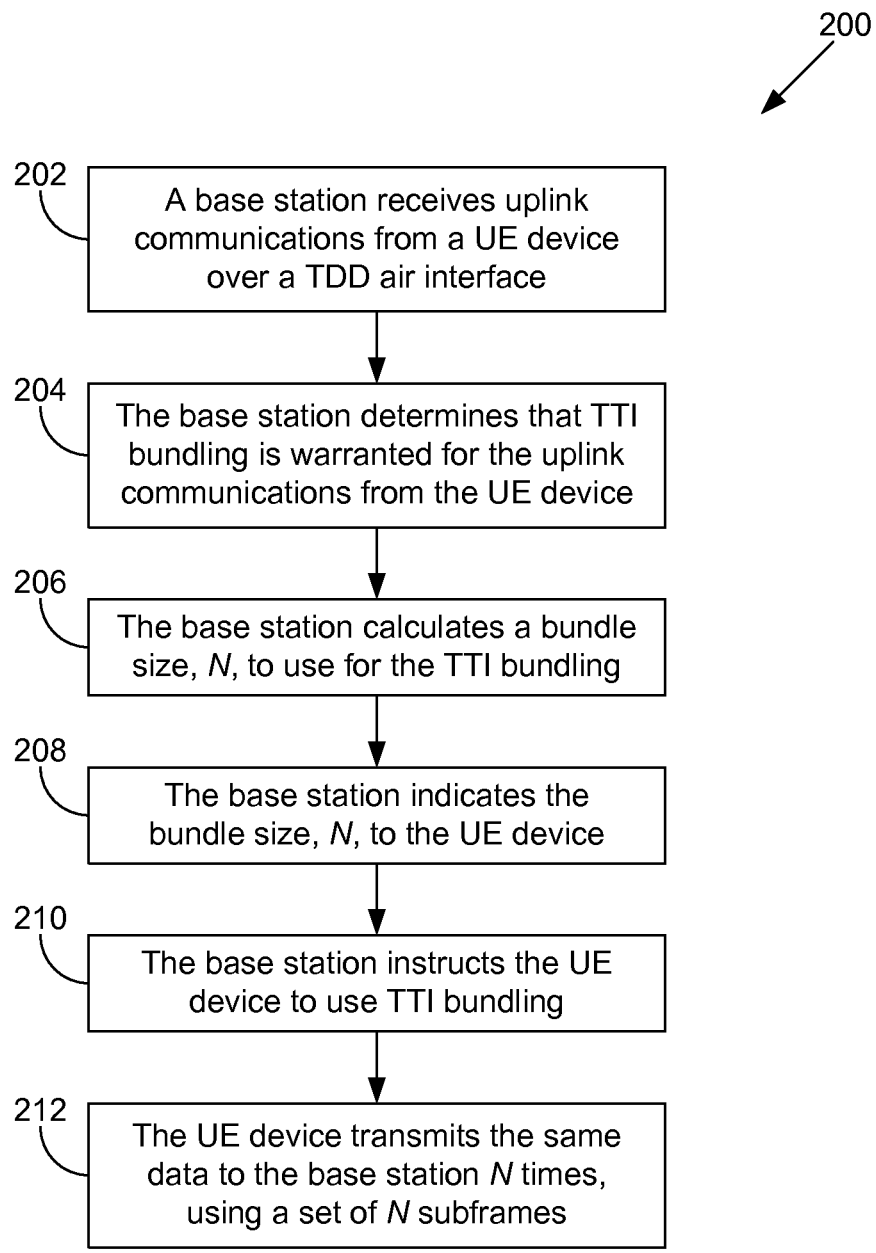
FIG. 3 is a flow chart of a method for uplink TTI bundling, in accordance with an example embodiment.
Figure 4:
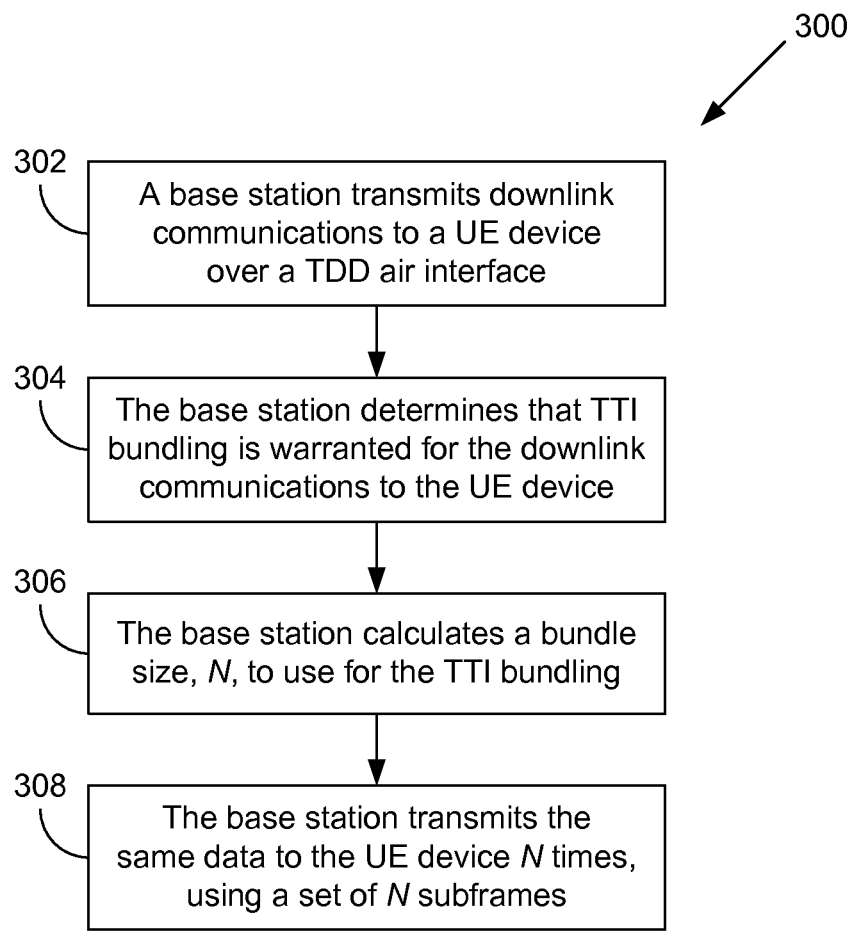
FIG. 4 is a flow chart of a method for downlink TTI bundling, in accordance with an example embodiment.
Figure 5:
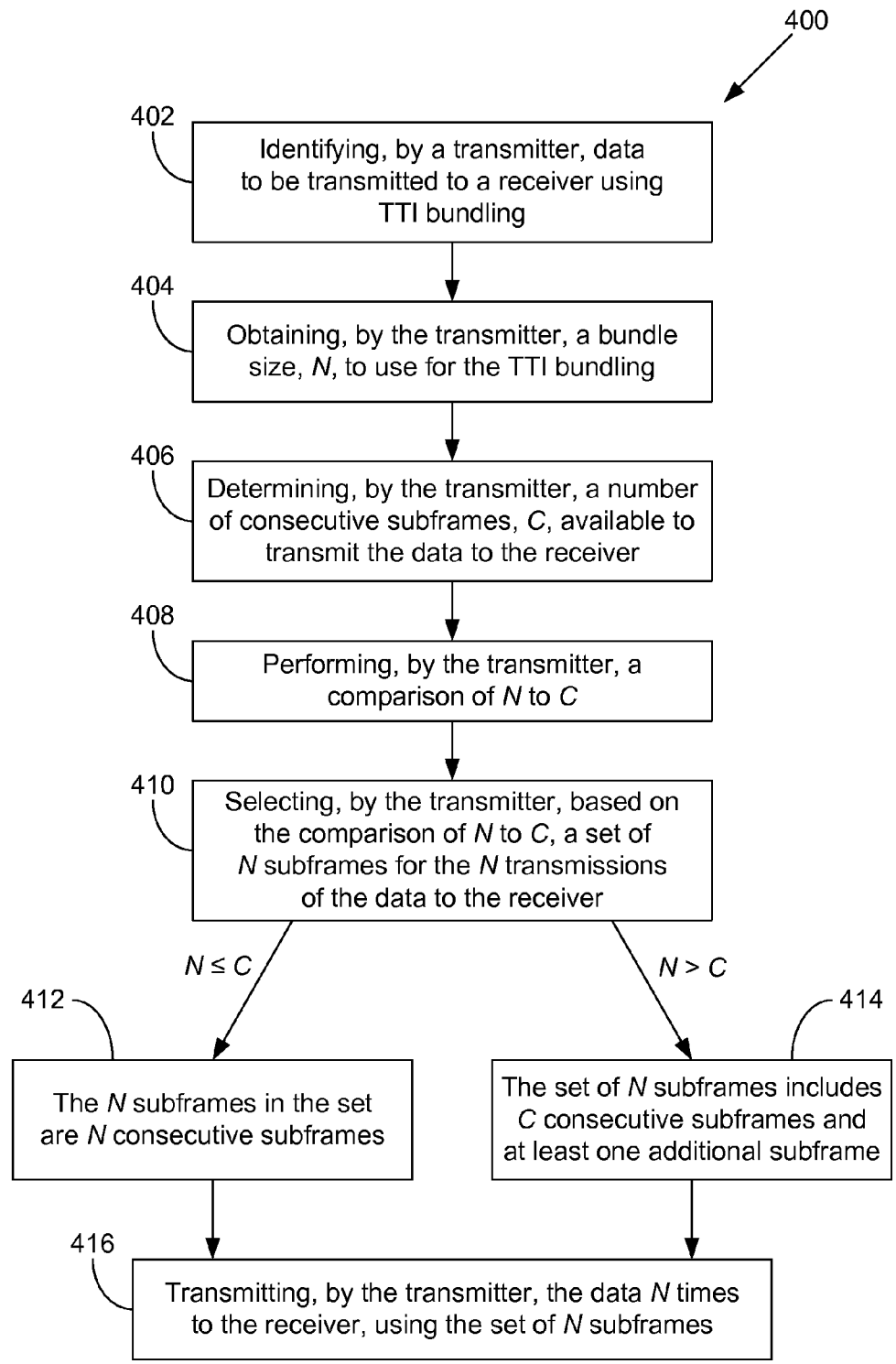
FIG. 5 is a flow chart of a method in which a transmitter selects a set of N subframes to transmit data using TTI bundling, in accordance with an example embodiment.

FIGS. 3-5 are flow charts illustrating example methods relating to TTI bundling. FIG. 3 illustrates an example method of implementing TTI bundling for uplink communications. FIG. 4 illustrates an example method of implementing TTI bundling for downlink communications. FIG. 5 illustrates an example method of selecting a set of N subframes to use for TTI bundling (on either the uplink or the downlink). For purposes of illustration, the example methods are described with reference to a communication system as shown in FIG. 1, air interface resources as shown in FIGS. 2A and 2B, and TDD configurations as shown in Table 1. It is to be understood, however, that the methods could be applied to other types of communication systems, air interface resources, and/or TDD configurations.

FIG. 3 is a flowchart illustrating an example method 200 for implementing TTI bundling for uplink communications from a UE device (e.g., UE device 16) to a base station (e.g., base station 14). In this example, the base station receives uplink communications from the UE device over a TDD air interface (e.g., air interface 22), as indicated by block 202. The TDD air interface could, for example, have one of the configurations set forth in Table 1. The uplink communications could include voice, video, or other data and could be associated with a bearer that has a predefined quality of service (QoS). As one example, the UE device could use a bearer with a guaranteed bit rate to transmit voice. As another example, the UE device could use a bearer with a non-guaranteed bit rate for Web browsing. Other examples are possible as well.

At some point, the base station determines that TTI bundling is warranted for the uplink communications from the UE device, as indicated by block 204. In an example, the base station may determine whether TTI bundling is warranted for the UE device based on at least a power headroom report that is received from the UE device. In LTE, a UE device may calculate a "power headroom" as a difference between the UE device's transmit power requirement for its uplink resource allocation and the UE device's maximum transmit power. If the power headroom that a UE device reports is positive, indicating that the UE device's transmit power requirement is less than its maximum transmit power, then the base station may conclude that TTI bundling is not warranted for the UE device. If the power headroom that the UE device reports is negative, indicating that the UE device's transmit power requirement is more than its maximum transmit power, then the base station may determine that TTI bundling is warranted for the UE device. Other methods for determining whether TTI bundling is warranted could be used as well.

The base station calculates a bundle size, N, to use for the TTI bundling, as indicated by block 206. The base station may calculate N as a function of one or more uplink TTI bundling parameters. In one example, the base station may use a function, F, to calculate N as follows:

$$N=F(P_1,P_2,P_3) \quad (1)$$

where $P_1$ is a signal-plus-interference-to-noise ratio (SINR) at the base station of a signal transmitted by the UE device, $P_2$ is a delay budget for transmission of the data, and $P_3$ is a utilization of the uplink shared channel.

The base station could determine $P_1$ (SINR) based on one or more measurements at the base station of signals transmitted by the UE device. In some examples, the base station may periodically measure the SINR of the UE's signals, and the base station could then determine $P_1$ based on one or more of those SINR measurements. Alternatively or additionally, the base station may measure the SINR of a signal transmitted by the UE device in response to determining that TTI bundling is warranted. In example embodiments, F could decrease as a function of increasing $P_1$ (SINR). In this regard, a higher SINR could indicate a higher link quality between the UE device and base station, such that a smaller bundle size, N, may be sufficient.

The base station may determine $P_2$ (delay budget) based on the type of bearer being used by the UE device for the uplink communications. For example, a guaranteed bit rate bearer may have a relatively low delay budget, whereas a non-guaranteed bit rate bearer may have a relatively high delay budget. In example embodiments, F could decrease as a function of decreasing $P_2$ (delay budget). In this regard, a lower delay budget may indicate a lower tolerance for delay, such that a smaller bundle size, N, may be beneficial in order to cause less transmission latency.

The base station may determine $P_3$ (utilization) based on how many of the uplink resource blocks that could be allocated by the base station to UE devices have already been allocated. In example embodiments, F could decrease as a function of increasing $P_3$ (utilization). In this regard, uplink TTI bundling typically increases the utilization of the uplink shared channel. Thus, if the uplink shared channel is already heavily utilized, it may be beneficial for the base station to select a smaller TTI bundle size, N, in order to conserve resources.

In some examples, F may map the uplink TTI bundling parameters ($P_1$, $P_2$, $P_3$) to one of a plurality of values of N. The plurality of values of N could be, for example: N=2, N=3, and N=4. In other examples, F may provide for a greater or fewer number of values of N and/or may allow N to be greater than 4. It is also to be understood that the particular set of three TTI bundling parameters given in equation (1) is meant to be exemplary only. N could alternatively be calculated based on additional and/or different parameters.

The base station indicates the bundle size, N, to the UE device, as indicated by block 208. The base also instructs the UE device to use TTI bundling, as indicated by block 210. In response, the UE transmits the same data to the base station N times, using a set of N subframes, as indicated by block 212. The UE device may select the set of N subframes, for example, as described below with reference to FIG. 5.

Although FIG. 3 shows steps of method 200 being performed in a particular order, it is to be understood that some of these steps could be performed in a different order and/or some of the steps could be omitted or combined. For example, FIG. 3 shows the base station calculating N (block 206) as occurring after the base station determines that TTI bundling is warranted (block 204). In some implementations, however, the base station may periodically calculate a value of N for a UE device being served by the base station.

The periodic calculations may occur before a determination that TTI bundling is warranted for the UE device, and the periodic calculations may continue after TTI bundling has been implemented. In this way, the base station may calculate different values of N as conditions change.

Along with the periodic calculations of N for a UE device, the base station may periodically indicate to the UE device the calculated value of N. In this way, when the base station subsequently determines that TTI bundling is warranted for the UE device, and instructs the UE device to use TTI bundling, the UE device may use the bundle size, N, that was previously indicated by the base station.

FIG. 4 is a flowchart illustrating an example method 300 for implementing TTI bundling for downlink communications from a base station (e.g., base station 14) to a UE device (e.g., UE device 16). In this example, the base station transmits downlink communications to the UE device over a TDD air interface (e.g., air interface 22), as indicated by block 302. The TDD air interface could, for example, have one of the configurations set forth in Table 1. The downlink communications could include voice, video, or other data and could be associated with a bearer that has a predefined QoS.

At some point, the base station determines that TTI bundling is warranted for the downlink communications to the UE device, as indicated by block 304. The base station may make this determination, for example, based on an indication from the UE device that the downlink channel quality has degraded. In particular, the UE device may measure a signal transmitted by the base station and report one or more parameters relating to the signal strength or signal quality. Such parameters may include, for example, a reference signal received power (RSRP), a reference signal received quality (RSRQ), and/or a signal-plus-interference-plus-noise ratio (SINR).

The base station calculates a bundle size, N, to use for the TTI bundling, as indicated by block 306. The base station may calculate N as a function of one or more downlink TTI bundling parameters. In one example, the base station may use a function, G, to calculate N as follows:

$$N=G(Q_1,Q_2,Q_3) \quad (2)$$

where $Q_1$ is a signal-plus-interference-to-noise ratio (SINR) at the UE device of a signal transmitted by the base station, $Q_2$ is a delay budget for transmission of the data, and $Q_3$ is a utilization of the downlink shared channel.

The base station could determine $Q_1$ (SINR) based on one or more measurements reported by UE device. For example, the UE device may periodically measure and report the SINR of the base station's signals. The base station could then determine $Q_1$ based on one or more of those SINR measurements. Alternatively or additionally, the UE device may measure the SINR of the base station's signal in response to an instruction from the base station. The base station may send such an instruction, for example, in response to determining that TTI bundling is warranted. In example embodiments, G could decrease as a function of increasing $Q_1$ (SINR). In this regard, a higher SINR could indicate a higher link quality between the base station and UE device, such that a smaller bundle size, N, may be sufficient.

The base station may determine $Q_2$ (delay budget) based on the type of bearer being used for the downlink communications to the UE device. For example, a guaranteed bit rate bearer may have a relatively low delay budget, whereas a non-guaranteed bit rate bearer may have a relatively high delay budget. In example embodiments, G could decrease as a function of decreasing $Q_2$ (delay budget). In this regard, a lower delay budget may indicate a lower tolerance for delay, such that a smaller bundle size, N, may be beneficial in order to cause less transmission latency.

The base station may determine $Q_3$ (utilization) based on how many of the downlink resource blocks that could be allocated by the base station to UE devices have already been allocated. In example embodiments, G could decrease as a function of increasing $P_3$ (utilization). In this regard, downlink TTI bundling typically increases the utilization of the downlink shared channel. Thus, if the downlink shared channel is already heavily utilized, it may be beneficial for the base station to select a smaller TTI bundle size, N, in order to conserve resources.

In some examples, G may map the downlink TTI bundling parameters ($Q_1$, $Q_2$, $Q_3$) to one of a plurality of values of N. The plurality of values of N could be, for example: N=2, N=3, and N=4. In other examples, G may provide for a greater or fewer number of values of N and/or may allow N to be greater than 4. It is also to be understood that the particular set of three TTI bundling parameters given in equation (2) is meant to be exemplary only. N could alternatively be calculated based on additional and/or different parameters.

Once the base station has calculated N, the base station transmits the same data to the UE device N times, using a set of N subframes, as indicated by block 308. The base station may select the set of N subframes, for example, as disclosed below for FIG. 5.

Although FIG. 4 shows steps of method 300 being performed in a particular order, it is to be understood that some of these steps could be performed in a different order and/or some of the steps could be omitted or combined. For example, FIG. 4 shows the base station calculating N (block 306) as occurring after the base station determines that TTI bundling is warranted (block 304). In some implementations, however, the base station may periodically calculate a value of N for a UE device being served by the base station. The periodic calculations may occur before a determination that TTI bundling is warranted for the downlink communications to the UE device, and the periodic calculations may continue after TTI bundling has been implemented. In this way, the base station may calculate different values of N as conditions change.

FIG. 5 illustrates an example method 400 that shows how a set of N subframes may be selected for transmitting data using TTI bundling. Method 400 refers to functions that are performed by a transmitter in relation to data that is to be transmitted from the transmitter to a receiver. In some examples, the transmitter could be a UE device and the receiver could be a base station, in which case method 400 may be performed in conjunction with method 200 shown in FIG. 3. In other examples, the transmitter could be a base station and the receiver could be a UE device, in which case method 400 may be performed in conjunction with method 300 shown in FIG. 4.

Method 400 may begin with identifying, by the transmitter, data to be transmitted to the receiver using TTI bundling, as indicated by block 402. Thus, at this point, it has been determined that TTI bundling is warranted for the transmitter. In some examples, the decision that TTI bundling is warranted is made by a base station, for both downlink communications from the base station to a UE device and for uplink communications from a UE device to the base station. Thus, in the case that the transmitter is a UE device, the data to be transmitted to the base station using TTI bundling may be identified after the UE device has received an instruction from the base station to use TTI bundling.

Method 400 may then proceed with obtaining, by the transmitter, a bundle size, N, for the TTI bundling, as indicated by block 404. In the case that the transmitter is a UE device, the bundle size, N, could be obtained by the UE device from the base station. For example, the base station may calculate N, such as by using equation (1) described above, and transmit an indication of the value of N. In some examples, the base station may periodically calculate a value of N for a UE device and indicate the calculated value of N to the UE device. Alternatively, the base station may indicate the value of N when instructing the UE device to use TTI bundling. In the case that the transmitter is a base station, the bundle size, N, may be obtained by the base station calculating N, such as by using equation (2) described above.

Method 400 may also involve determining, by the transmitter, a number of consecutive subframes, C, available to transmit the data to the receiver, as indicated by block 406. The transmitter may determine C based on the TDD configuration that is currently being used. In the case that the transmitter is a UE device, C may be the number of consecutive uplink subframes in the TDD configuration. In the case that the transmitter is a base station, C may be the number of consecutive downlink subframes in the TDD configuration. In some implementations, however, a base station may be able to use special subframes for downlink communications. Thus, in the case that the transmitter is a base station, C may be a number of consecutive subframes that includes one or more downlink subframes and one or more special subframes.

Once N has been obtained by the transmitter and C determined by the transmitter, method 400 may proceed with performing, by the transmitter, a comparison of N to C, as indicated by block 408. The comparison may, for example, involve determining whether N is less than C, equal to C, or greater than C.

Method 400 may then involve selecting, by the transmitter, based on the comparison of N to C, a set of N subframes for the N transmissions of the data to the receiver, as indicated by block 410. In the case that N≤C, the N subframes in the set are N consecutive frames, as indicated by block 412. In the case that N>C, the set of N subframes includes C consecutive subframes and at least one additional subframe, as indicated by block 414. The at least one additional subframe is separated from the C consecutive subframe by one or more subframes that are not in the set of N subframes.

Method 400 may conclude with transmitting, by the transmitter, the data N times to the receiver, using the set of N subframes. Thus, in the case that the transmitter is a UE device and the receiver is a base station, the UE device may transmit the data N times to the base station using a set of N subframes (i.e., uplink subframes), with each transmission of data occurring in one of the subframes in the set. In the case that the transmitter is a base station and the receiver is a UE device, the base station may transmit the data N times to the UE device using a set of N subframes (i.e., either downlink subframes or a combination of downlink and special subframes), with each transmission of data occurring in one of the subframes in the set.

Figure 6:
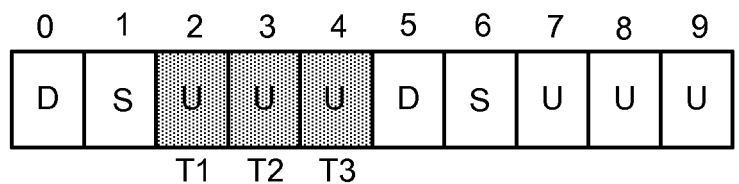
FIG. 6 illustrates a sequence of subframes used for uplink TTI bundling in a TDD configuration, in accordance with an example embodiment.
Figure 7:
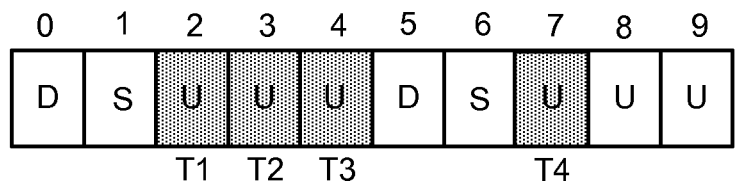
FIG. 7 illustrates a sequence of subframes used for uplink TTI bundling in a TDD configuration, in accordance with an example embodiment.
Figure 8:
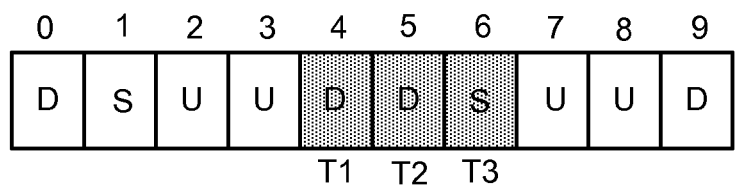
FIG. 8 illustrates a sequence of subframes used for downlink TTI bundling in a TDD configuration, in accordance with an example embodiment.
Figure 9:
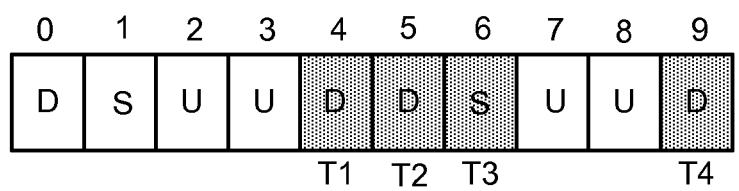
FIG. 9 illustrates a sequence of subframes used for downlink TTI bundling in a TDD configuration, in accordance with an example embodiment.

FIGS. 6 and 7 illustrate subframes that may be used by a UE device to transmit data to a base station, using TTI bundling with different bundle sizes. FIGS. 8 and 9 illustrate subframes that may be used by a base station to transmit data to a UE device, using TTI bundling with different bundle sizes. For purposes of illustration, FIGS. 6-9 each illustrate a single frame having 10 subframes, in which the subframes are labeled "0" through "9." Uplink subframes are labeled "U," downlink subframes are labeled "D," and special subframes are labeled "S." The subframes used to transmit data using TTI bundling are indicated by shading and are further labeled "T1," "T2," etc.

FIGS. 6 and 7 illustrate examples in which a UE device transmits data using TTI bundling with an air interface in TDD configuration 0. As shown in Table 1, TDD configuration 0 has three consecutive uplink subframes. Thus, C=3 in these examples.

FIG. 6 illustrates an example in which N=3. Since N=C, the UE device selects a set of 3 consecutive uplink subframes to use to transmit by the data. The 3 consecutive uplink frames could be, for example, subframes 2, 3, and 4, as indicated in FIG. 6. Thus, in this example, the UE device would transmit the data a first time (transmission T1) in subframe 2, transmit the data a second time (transmission T2) in subframe 3, and transmit the data a third time (transmission T3) in subframe 4. It is to be understood that this particular selection of subframes is only one possible example. TDD configuration 0 also has another group of 3 consecutive uplink subframes: subframes 7, 8, and 9. Thus, with N=3 in TDD configuration 0, a UE device may use either subframes 2, 3, and 4 or subframes 7, 8, and 9 to transmit the data.

FIG. 7 illustrates an example in which N=4. Thus, the UE device selects a set of 4 uplink subframes to transmit the data. However, since N>C, the subframes in the set are not all consecutive. For example, as shown in FIG. 7, the set of 4 subframes may include 3 consecutive uplink subframes (e.g., subframes 2, 3, and 4) and another uplink subframe (e.g., subframe 7) that is separate from the 3 consecutive uplink frames. Thus, in this example, the UE device would transmit the data a first time (transmission T1) in subframe 2, transmit the data a second time (transmission T2) in subframe 3, transmit the data a third time (transmission T3) in subframe 4, and transmit the data a fourth time (transmission T4) in subframe 7. It is to be understood that this particular selection of subframes is only one possible example. In another example, a UE device may use subframes 7, 8, and 9 in one frame and subframe 2 in the next frame to transmit the data. Other examples are possible as well.

FIGS. 8 and 9 illustrate examples in which a base station transmits data to a UE device using TTI bundling with an air interface in TDD configuration 1. As shown in Table 1, TDD configuration 1 has two consecutive downlink subframes. However, these examples assume that the base station is able to use special subframes to transmit data to the UE device. As a result, the special subframes are grouped together with the downlink subframes to provide a total of three consecutive subframes that the base station can use to transmit data. Thus, C=3 in these examples.

FIG. 8 illustrates an example in which N=3. Since N=C, the base station selects a set of 3 consecutive subframes to use to transmit by the data. The 3 consecutive frames could be, for example, subframes 4, 5, and 6, as indicated in FIG. 8. Thus, in this example, the base would transmit the data a first time (transmission T1) in subframe 4, transmit the data a second time (transmission T2) in subframe 5, and transmit the data a third time (transmission T3) in subframe 6. It is to be understood that this particular selection of subframes is only one possible example. In another example, the base station may use subframe 9 in one frame and subframes 0 and 1 in the next frame to transmit the data.

FIG. 9 illustrates an example in which N=4. Thus, the base station selects a set of 4 subframes to transmit the data. However, since N>C, the subframes in the set are not all consecutive. For example, as shown in FIG. 9 the set of 4 subframes may include 3 consecutive subframes (e.g., subframes 4, 5, and 6) and another subframe (e.g., subframe 9) that is separate from the 3 consecutive frames. Thus, in this example, the base station would transmit the data a first time (transmission T1) in subframe 4, transmit the data a second time (transmission T2) in subframe 5, transmit the data a third time (transmission T3) in subframe 6, and transmit the data a fourth time (transmission T4) in subframe 9. It is to be understood that this particular selection of subframes is only one possible example. In another example, a UE device may use subframe 9 in one frame and subframes 0, 1, and 4 in the next frame to transmit the data. Other examples are possible as well.

4. Example Apparatus

Figure 10:
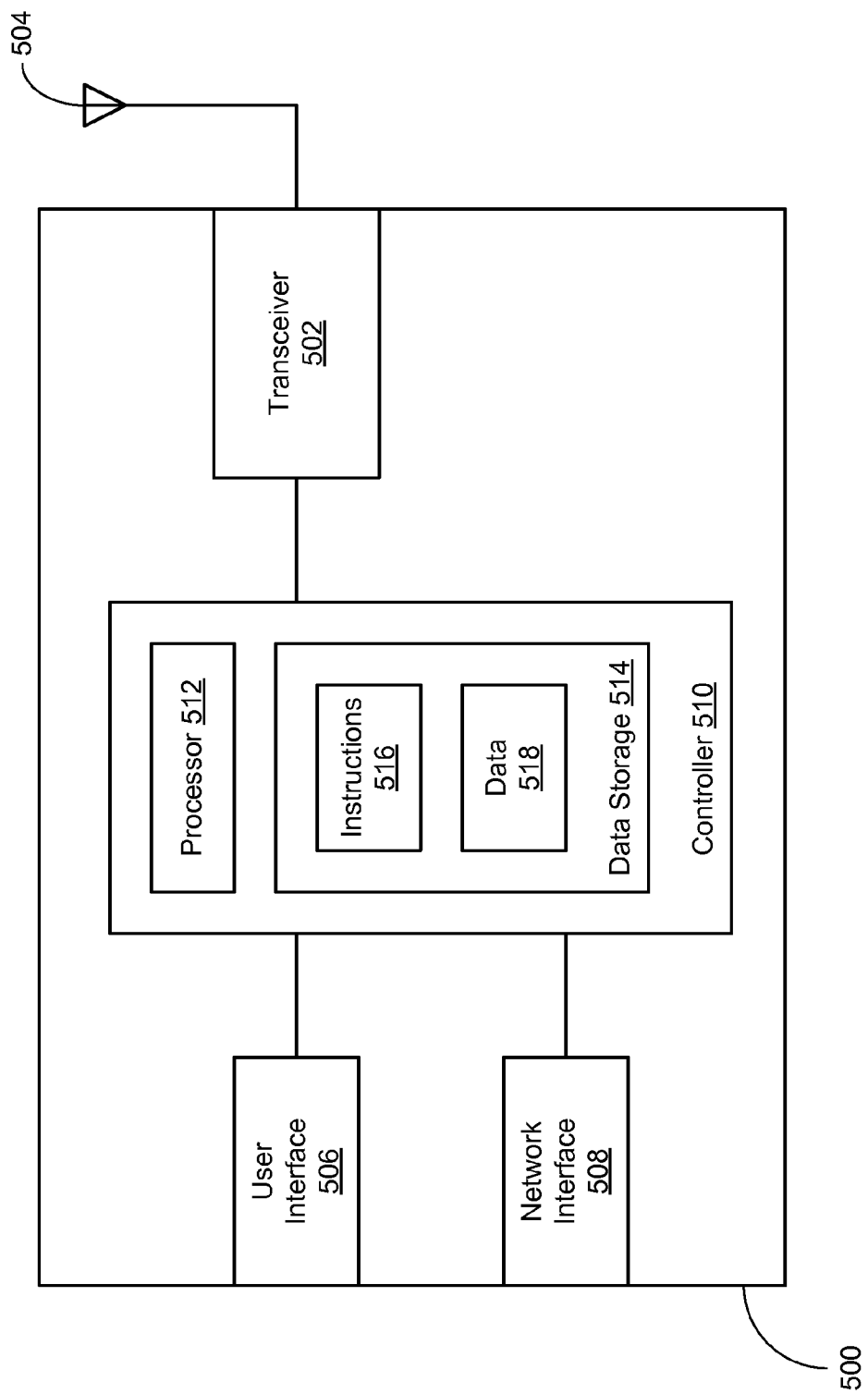
FIG. 10 is a block diagram of an apparatus, in accordance with an example embodiment.

FIG. 10 illustrates an example apparatus 500, which could correspond to either a base station or a UE device, for example, as described above in relation to any of FIGS. 1-9. Apparatus 500 includes a transceiver 502 that can transmit and receive wireless communications via one or more antennas, exemplified by antenna 504. The wireless communications may include uplink communications in an uplink shared channel and downlink communications in a downlink shared channel. The uplink and downlink shared channels may each be divided in time and frequency domains into a plurality of resource blocks, for example, as described above in relation to FIGS. 2A and 2B. The uplink and downlink communications may occur during alternating time periods, for example, in accordance with a TDD configuration shown in Table 1. The TDD configuration may specify that a time period for uplink communications has U consecutive subframes and a time period for downlink communications has D consecutive subframes, wherein U≥1 and D≥1.

The wireless communications transmitted and/or received by transceiver 502 may include voice, video, or other data. At least some of the data transmitted or received transceiver 502 may relate to data that is input into apparatus 500 or data that is output from apparatus 500 via one or more interfaces. In some examples (particularly in the case that apparatus 500 is a UE device), apparatus 500 may include a user interface 506. User interface 506 may include a display configured to convey textual, graphical, or other visual information to a user of apparatus 500. User interface 506 may also include a touch screen, keyboard, buttons, and/or other means configured to receive input from a user of apparatus 500. User interface 506 may further include audio input and output means, such as a microphone to receive voice or other audio from a user of apparatus 500 and a speaker to convey voice or other audio to the user.

In some examples (particularly in the case that apparatus is a base station), apparatus 500 may include a network interface 508. Apparatus 500 may use network interface 508 to communicate with one or more entities, such as entities in RAN 12, via wired or wireless connections.

The operations of apparatus 500 may be controlled by a controller 510, which, in turn, may be coupled to other elements of apparatus, such as transceiver 502, user interface 506, and/or network 508. Controller 510 could be implemented using hardware, software, and/or firmware. In an example embodiment, controller 510 includes a processor 512 and data storage 514. Data storage 514 may include any type of non-transitory computer readable medium, such as random access memory (RAM), read-only memory (ROM), flash memory, cache memory, one or more magnetically encoded disks, one or more optically encoded disks, and/or any other type of volatile or non-volatile memory. Data storage 514 may store instructions 516 and data 518. Instructions 516 could be executable program instructions that, when executed by processor 512, cause apparatus 500 to perform functions, such as any of the functions described herein. Data 518 may include, for example, values of N and C, data used to determine bundle sizes, and/or any other type of data that may be generated or used by controller 510.

In one example, controller 510 may be configured (e.g., by instructions 516 stored in data storage 514 and executable by processor 512) to perform the following functions: (a) identifying data to be transmitted to a receiver using TTI bundling; (b) obtaining a bundle size, N, to use for the TTI bundling (e.g., by receiving an indication of N from a base station or by calculating N), wherein N>1; (c) determining a number of consecutive subframes, C, available to transmit the data to the receiver; (d) performing a comparison of N to C; (e) selecting, based on the comparison of N to C, a set of N subframes for N transmissions of data to the receiver; and (f) transmitting, via the transceiver 502, the data N times to the receiver using the set of N subframes.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for wireless communication in a wireless communication network using a time division duplexing (TDD) configuration, wherein the TDD configuration specifies alternating time periods for uplink communications and downlink communications, in which a time period for uplink communications has U consecutive subframes and a time period for downlink communications has D consecutive subframes, wherein U≥1 and D≥1, the method comprising:
   identifying, by a transmitter, data to be transmitted to a receiver over a shared channel using transmission time interval (TTI) bundling;
   obtaining, by the transmitter, a bundle size, N, for the TTI bundling, wherein N>1, and wherein N is a function of at least one of a signal-to-interference-plus-noise ratio (SINR) at the receiver of a signal transmitted by the transmitter, a delay budget for transmission of the data to the receiver, and a utilization of the shared channel;
   determining, by the transmitter, a number of consecutive subframes, C, available to transmit the data to the receiver;
   performing, by the transmitter, a comparison of N to C;
   selecting, by the transmitter, based on the comparison of N to C, a set of N subframes for N transmissions of the data to the receiver; and
   transmitting, by the transmitter, the data N times to the receiver, using the set of N subframes.

2. The method of claim 1, wherein performing the comparison of N to C comprises determining that N≤C, and wherein the N subframes in the set are N consecutive subframes.

3. The method of claim 1, wherein performing the comparison of N to C comprises determining that N>C, and wherein the set of N subframes includes C consecutive subframes and at least one additional subframe separated from the C consecutive subframes by one or more subframes not in the set.

4. The method of claim 1, wherein the transmitter is a user equipment (UE) device and the receiver is a base station, and wherein C=U.

5. The method of claim 1, wherein the transmitter is a base station and the receiver is a user equipment (UE) device, and wherein C=D.

6. The method of claim 1, wherein the transmitter is a user equipment (UE) device, the receiver is a base station, and the shared channel is an uplink shared channel.

7. The method of claim 6, wherein obtaining, by the transmitter, a bundle size, N, for the TTI bundling comprises:
receiving, by the UE device, an indication of N from the base station.

8. The method of claim 7, wherein N is calculated by the base station as a function of at least one of a SINR at the base station of a signal transmitted by the UE device, a delay budget for transmission of the data to the base station, and a utilization of the uplink shared channel.

9. The method of claim 6, wherein the transmitter is a base station, the receiver is a user equipment (UE) device, and the shared channel is a downlink shared channel.

10. The method of claim 9, wherein obtaining, by the transmitter, a bundle size, N, for the TTI bundling comprises:
calculating, by the base station, N as a function of at least one of a SINR at the UE device of a signal transmitted by the base station, a delay budget for transmission of the data to the UE device, and a utilization of the downlink shared channel.

11. An apparatus, comprising:
a transceiver for transmitting and receiving wireless communications according to a time division duplexing configuration (TDD), wherein the TDD configuration specifies alternating time periods for uplink communications and downlink communications, in which a time period for uplink communications has U consecutive subframes and a time period for downlink communications has D consecutive subframes, wherein U≥1 and D≥1;
a processor;
data storage;
program instructions stored in the data storage and executable by the processor to cause the apparatus to perform functions, the functions comprising:
identifying data to be transmitted to a receiver over a shared channel using transmission time interval (TTI) bundling;
obtaining a bundle size, N, to use for the TTI bundling, wherein N>1, and wherein N is a function of at least one of a signal-to-interference-plus-noise ratio (SINR) at the receiver of a signal transmitted via the transceiver, a delay budget for transmission of the data to the receiver, and a utilization of the shared channel;
determining a number of consecutive subframes, C, available to transmit the data to the receiver;
performing a comparison of N to C;
selecting, based on the comparison of N to C, a set of N subframes for N transmissions of the data to the receiver; and
transmitting, via the transceiver, the data N times to the receiver, using the set of N subframes.

12. The apparatus of claim 11, wherein performing the comparison of N to C comprises determining that N≤C, and wherein the N subframes in the set are N consecutive subframes.

13. The apparatus of claim 11, wherein performing the comparison of N to C comprises determining that N>C, and wherein the set of N subframes includes C consecutive subframes and at least one additional subframe separated from the C consecutive subframes by one or more subframes not in the set.

14. The apparatus of claim 11, wherein the apparatus comprises a user equipment (UE) device and the receiver comprises a base station of a wireless communication network, and wherein C=U.

15. The apparatus of claim 14, wherein obtaining a bundle size, N, for the TTI bundling comprises:
receiving, via the transceiver, an indication of N from the base station.

16. The apparatus of claim 11, wherein the apparatus comprises a base station of a wireless communication network and the receiver comprises a user equipment (UE) device, and wherein C=D.

17. The apparatus of claim 16, wherein the functions further comprise:
calculating N as a function of at least one of a SINR at the UE device of a signal transmitted by the base station, a delay budget for transmission of the data to the UE device, and a utilization of a downlink shared channel.

* * * * *